(12) United States Patent
Nestoriuc (10) Patent No.: US 9,523,323 B2
(45) Date of Patent: Dec. 20, 2016

(54) METHOD AND DEVICE FOR MONITORING AN ACTUATOR DEVICE

(71) Applicant: AVL Deutschland GmbH, Mainz-Kastel (DE)

(72) Inventor: Max Nestoriuc, Munich (DE)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 14/403,983

(22) PCT Filed: May 31, 2013

(86) PCT No.: PCT/EP2013/001609
§ 371 (c)(1),
(2) Date: Feb. 12, 2015

(87) PCT Pub. No.: WO2013/178367
PCT Pub. Date: Dec. 5, 2013

(65) Prior Publication Data
US 2015/0167574 A1 Jun. 18, 2015

(30) Foreign Application Priority Data
May 31, 2012 (DE) ........................ 10 2012 010 868

(51) Int. Cl.
*F02D 41/22* (2006.01)
*H01F 7/18* (2006.01)
*F02D 41/20* (2006.01)

(52) U.S. Cl.
CPC ............ *F02D 41/221* (2013.01); *F02D 41/20* (2013.01); *H01F 7/1844* (2013.01); *F02D 2041/2058* (2013.01); *Y02T 10/40* (2013.01)

(58) Field of Classification Search
CPC  F02D 41/20; F02D 41/221; F02D 2041/2058; H01F 7/1844; Y02T 10/40
(Continued)

(56) References Cited

U.S. PATENT DOCUMENTS

| 5,678,521 A | 10/1997 | Thompson et al. |
| 5,954,030 A | 9/1999 | Sturman et al. |
| 2011/0273812 A1* | 11/2011 | Beer ....................... F02D 41/20 361/152 |

FOREIGN PATENT DOCUMENTS

| DE | 4230877 | 4/1993 |
| DE | 10108425 | 6/2002 |

(Continued)

OTHER PUBLICATIONS

International Preliminary Report on Patentability dated Dec. 11, 2014 received in corresponding International Patent Application No. PCT/EP2013/001609.
(Continued)

*Primary Examiner* — McDieunel Marc
*Assistant Examiner* — James E Stroud
(74) *Attorney, Agent, or Firm* — Knobbe Martens Olson & Bear LLP (57) ABSTRACT

A method for assessing the status of an electromechanical actuator device is disclosed. The actuator device is provided for actuating control element apparatuses in an internal combustion engine for a motor vehicle. This actuator device has an activation apparatus and a stator apparatus as well as at least one electrical coil apparatus. The actuator device can be changed over from a first operating state into a second operating state. During the changeover, activation power is fed to the coil apparatus by a control line apparatus. In the method, the activation power is fed to the actuator device, the feeding of the activation power is reduced, and the control line apparatus is monitored and an actuator assessment characteristic variable is determined from the data acquired in the process. Furthermore, the actuator assessment characteristic variable is assessed by a comparison variable which is based on the fed-in activation power.

14 Claims, 2 Drawing Sheets

(58) Field of Classification Search
USPC .......................................................... 701/32.8
See application file for complete search history.

(56) References Cited

FOREIGN PATENT DOCUMENTS

| | | | | |
|---|---|---|---|---|
| DE | 10349898 | 5/2005 | | |
| EP | 0408963 | 1/1991 | | |
| EP | 2511918 | 10/2012 | | |
| GB | 2279829 | 1/1995 | | |
| GB | 2279829 A | * 1/1995 | ........... | G06F 1/1626 |

OTHER PUBLICATIONS

International Search Report dated Feb. 12, 2013 for International Application No. PCT/EP2013/001609.

* cited by examiner

Fig.2

METHOD AND DEVICE FOR MONITORING AN ACTUATOR DEVICE

The invention relates to a method and an apparatus for monitoring an actuator apparatus.

In motor vehicles, a plurality of control and operational functions are performed or supported by electrical actuator apparatus, particularly electromechanical control apparatus. On one hand, such actuator apparatus can serve functions such as for example seat adjustment, window regulation or sunroof operation, on the other they can also serve technical functions such as for example activating an electrical parking brake or varying the internal combustion engine ventilation or the like. While the functional efficiency of some of these actuator apparatus is easily monitored by the driver as well as during servicing of the vehicle, other control functions run virtually imperceptibly, making it usually only possible to identify a malfunction of same with difficulty. Yet particularly technical control functions are of nevertheless great importance to the vehicle's operation, whether with respect to the vehicle's safety or even with respect to the vehicle's efficiency or harmful emissions or the like.

Actuator apparatus which perform the above-cited and other control functions are frequently integrated into the vehicle's components (trim components, vehicle body, etc.) and thus usually only accessible with difficulty. This poor accessibility not only makes their monitoring but also their servicing more difficult such that it is desirable to be able to make a reliable and the most accurate possible diagnosis of same, at best while still in regular operation. An appropriate diagnosis enables malfunctions to be selectively remedied and potentially even prevent the complete failure of the actuator apparatus. Information indicating that an actuator apparatus is no longer functioning properly is usually not enough to enable taking the appropriate repair measures. Thus, in order to obtain more detailed information on the malfunction and the operation of the actuator apparatus, more detailed information on a given malfunction is desirable.

The diagnostic function takes on increased importance particularly in the case of actuator apparatus performing control functions in internal combustion engines due to their repair normally being particularly time-consuming and cost-intensive.

Using actuator apparatus for control functions in motor vehicles, particularly in internal combustion engines, is known from the prior art. Such control functions are usually varying the valve timing (opening/closing timing) for the gas exchange control elements (intake/exhaust valves) or varying the actuation intensity (variable valve stroke). DE 103 49 898 A1 discloses to this end a valve train of an internal combustion engine comprising at least one camshaft while DE 42 30 877 A1 discloses to this end a valve control for a lift valve comprising two cams. In so doing, the functional efficiency of the actuator apparatus is frequently monitored by means of reaching position markings or by means of monitoring its power input, particularly by means of monitoring the actuator apparatus power curve. Should the actuator apparatus not properly reach its position marking following a control command from the control unit or should there be irregularities in the returned power/output curve, an actuator apparatus malfunction can then be concluded.

The objective of the present invention is that of providing a method for assessing status which enables a more precise assessment of the state of an actuator apparatus compared to the prior art and thus contributes to increasing the functional reliability of the motor vehicle; a further objective is providing an apparatus to realize the method.

This objective is accomplished by a method in accordance with claim 1 and an apparatus according to claim 8; advantageous further developments comprise the subject matter of the subclaims.

The method according to the invention is provided for the monitoring of an actuator apparatus, whereby the actuator apparatus is in particular provided for the controlling of control element devices in an internal combustion engine, particularly a valve train in a motor vehicle. Said actuator apparatus comprises an actuating device and a stator device as well as at least one electrical coil device. The actuator apparatus can be changed from a first operating state into a second operating state. When changing over from said first into said second operating state, the electrical coil device is supplied actuating power by a control line device. The actuating power creates an actuating force between the stator device and the actuating device. When changing over from said second into said first operating state, a restoring force acts on the actuator apparatus, said restoring force particularly effected by the control element device. Alternatively, actuating power, albeit in this case restoring, can also be again fed to the coil device so as to set a restoring force inverse to the actuating force.

In a first method step, actuating power is supplied to the actuator apparatus. In a second method step, the supply of actuating power is reduced, in particular interrupted. In a third method step, the control line device is monitored and an actuator assessment parameter determined from the data thereby acquired. In a fourth method step, the actuator assessment parameter is assessed using a comparative value based on the actuating power supplied.

At least one comparative value is used to assess the actuator assessment parameter. Preferably, said comparative value is based on the planned power supplied (actuating power). Preferably, the planned electrical loss which occurs when transmitting actuating power, and preferentially also the loss which occurs when transmitting from the coil to the electrical measuring device, is determined by measurement or calculation. Further preferably, at least one or both of the electrical losses are factored into the comparative value determination. Further preferably, the total loss is determined from said two electrical losses. Preferably, at least one of said electrical losses is deducted from the actuating power in the comparative value determination and thus particularly a loss-adjusted comparative value provided. Further preferably, a multiple of the electrical losses is incorporated in the cited manner, preferably 1 to 5 times, preferentially 1.1 to 2.5 times and particularly preferentially 1.2 to 1.75 times the electrical loss. Thus, should the actuator assessment parameter determined from the monitoring of the control line device be less than the comparison value, it can thus then be in particular determined that the currently prevailing electrical loss clearly exceeds the planned electrical loss and the actuator apparatus is consequently no longer functioning properly or that a malfunction of same is at least imminent. It is further preferable for sequentially determined actuator assessment parameters to be stored and likewise drawn on in the comparison with the currently determined actuator assessment parameters.

Comparing a plurality of actuator assessment parameters determined at different times enables the assessment of the actuator apparatus' operability trend. Drawing on the comparative value in assessing the actuator assessment parameter particularly results in an improved method of assessing the actuator apparatus.

By means of the actuator assessment parameter, a systematic degradation of the actuator cycle time, particularly the actuator dead time, can be adapted in the control, preferentially by a software program. Thus, operability can continue to be guaranteed within a specific range of actuator cycle time degradation and shiftover errors prevented or at least reduced respectively, in any case up to complete failure of the actuator.

The inventive method has the advantage of being able to monitor the electrical functional efficiency of the electromechanical actuator apparatus and its connections and control without needing to disassemble the engine or a further test system being required to test the electrical components.

As defined by the invention, a stator device is to be understood as a permanently mounted device, thus preferentially stationary relative to a mount, crankcase, engine mounting, body component or the like. Preferably, a stator device is connected to a coil device in stationary manner. Further preferably, a stator device comprises a ferromagnetic material.

As defined by the invention, a coil device is to be understood as a device which, as long as current flows through it, generates a magnetic field. Preferably, a coil device comprises an electrical conductor wound around an imaginary axis, preferably wound multiple times. The energy stored within a coil device after being supplied with electrical power is in particular to be understood as the coil energy; the power flow resulting from discharging this energy is in particular to be understood as the coil power.

As defined by the invention, an actuator apparatus is to be understood as an electromechanical apparatus, an actuator apparatus preferably converts electrically supplied power into a force. It is preferably also possible for the force obtained through the conversion to counteract a spring force or the like. An actuator apparatus is to execute actuating processes to that end, preferably in a motor vehicle and particularly preferably in the internal combustion engine of a motor vehicle. Preferably, an actuator apparatus moves in order to execute an actuating process. Preferably, said movement takes place due to the force induced by the supplied power or due to that force combined with the spring force. Preferentially, the movement is a translational or rotational movement or a combination of same. Preferentially, an actuator apparatus is longitudinally variable and realizes a translational movement. The longitudinal variability is preferably achieved by a plurality of, preferentially two, devices, preferentially supported against each other. Preferably, an actuator apparatus comprises an actuating device and a stator device as well as a coil device. Preferably, the coil device is fixedly connected to one of the two devices (actuating device, stator device), preferably non-displaceably, whereby preferentially the respectively other device is movable relative to the coil device, preferably translationally displaceable.

As defined by the invention, an actuating device is to be understood as a device which is displaceably mounted relative to the stator device. Preferably, the actuating device is moved relative to the stator device, preferentially translationally displaced, to realize the adjusting function of the actuator apparatus. Preferably, the actuating device comprises, at least sectionally, a permanently magnetic material. Preferably, the actuating device is designed such that it is covered, at least in some of its area, by the coil device at least in the non-actuated state of the actuator apparatus, thus in particular in its first operating state. Preferentially, the actuating device is designed and mounted relative to the stator device such that at least part of its area is covered by a magnetic field which is generated when a current flows through the coil device. Preferably, an area of the actuating device is designed to actuate a control element device. Preferably, the actuating device comprises a heat-treatable material in such an area, preferably a temperable or curable material. Preferably, the actuating device comprises in this area a hardness in the range of from 50 to 64 HRC, preferentially 52 to 62 HRC, and particularly preferentially 55 to 58 HRC. Preferably, the actuating device comprises wear protection in this area, preferentially a sliding material such as bronze, plastic or the like, it is further preferable for an actuating device to be of convex, spherical, or round configuration in this area; as a substantially cylindrical pin is particularly preferential.

As defined by the invention, a first and a second operating state is to be understood as two different states of the actuator apparatus relative to the locational orientation, the geometrical position respectively, of the actuating device to the stator device. Preferably, a first operating state refers to a non-actuated or idle state and a second operating state refers to an actuated or working state. Preferentially, the actuator apparatus exerts in its second operating state, or on its way from the first into said second operating state respectively, an action of force on the device to be actuated by the actuator apparatus, preferably a control element device in an internal combustion engine.

As defined by the invention, a control line device is to be understood as a device with which power to actuate the actuating device is transmitted. Preferably, a control line device comprises control devices for regulating an electrical power flow. Preferably, control devices are to be understood as switching devices, diodes, thyristors, relay devices or other devices for regulating electrical currents, particularly power-electronic components and the like. Further preferably, the control line device comprises conductors for carrying electrical charge carriers, preferably wires, cable, circuit paths or the like. Preferably, a control line device is to be understood as an electrical circuit for the supply and control of the electrical power flow to the actuator apparatus from an electrical energy source, preferably a vehicle power supply network.

As defined by the invention, actuating power is to be understood as that electrical power which is supplied to the actuating device. Preferably, the actuator apparatus is fed actuating power in order to be converted from the one into the respectively other operating state. Further preferably, the actuator apparatus is fed an actuating power which is so low that the actuating device is not moved into its final position relative to the stator device, preferentially not moved substantially at all relative to the stator device. Such a reduced actuating power can be supplied prior or subsequent to or as a concurrent portion of the actuating power provided for actuation. Further preferably, said reduced actuating power can be understood as a testing power, particularly for testing the actuator apparatus. Further preferably, the actuating power is the electrical power which is supplied to the coil device by the control line device to change the actuator apparatus from the first into the second operating state.

As defined by the invention, actuating force is to be understood as the force which changes the actuator apparatus from its first into its second operating state. Preferably, the actuating power fed to the coil device generates a magnetic field which produces the actuating force on the actuating device. Preferably, the actuating device realizes an actuating movement as a result of the actuating force.

As defined by the invention, restoring force is to be understood as the force which changes the actuator apparatus over from its second into its first operating state. Preferably, the control element device applies the restoring force to in particular the actuating device. Preferably, the restoring force acts in opposite direction to the actuating force.

As defined by the invention, restoring actuating power is to be understood as that electrical power which is fed to the actuator apparatus in order to change it over from said second into said first operating state. Preferably, the control line device feeds the restoring actuating power to the coil device as electrical power.

As defined by the invention, the interruption and/or reduction of the power supply to the coil device is to be understood as a reduction and/or halting of the actuating power supply.

As defined by the invention, the monitoring of the control line device is to be understood as the determining of at least one electrical variable, preferably a voltage or a current, by means of an applicable measuring device. Preferably, the temporal profile of at least one electrical variable is determined. Further preferably, the voltage and the current or their temporal profile respectively is determined. Further preferably, said determination is made only during a specific time period and not over the entire operating period of the actuator apparatus. Preferably, the planned position of a control element device is used as the trigger condition for starting and ending said monitoring. Particularly preferentially, a displacement or rotation angle position of the device on which the actuating device exerts a planned force is used as the trigger condition.

As defined by the invention, an actuator assessment parameter is to be understood as a parameter for assessing the actuator apparatus. Preferably, the parameter is based on measured and particularly preferentially calculated electrical variables. Preferably, said parameter is determined based on at least one of the electrical variables determined during the control line device monitoring. Preferably, the actuator assessment parameter is based on the voltage profile determined over time and, additionally or alternatively, the current profile determined over time in the monitoring. Further preferably, the actuator assessment parameter is based on the integration, or numerical summation respectively, of at least one of said determined variables (voltage profile, current profile), further preferentially on the integration, or numerical summation respectively, of the product of the temporal profile of the voltage and current profile over time as determined in the control means device monitoring. Preferably, the actuator assessment parameter represents a measure of the actuating power fed to the coil device. Preferentially, the actuator assessment parameter represents the energy content of the coil device, based on which the supply of power (actuating power) is interrupted and is thus particularly a measure of the energy stored in the coil device from the supply of actuating power.

As defined by the invention, assessment of the actuator assessment parameter refers to the actuator assessment parameter being compared to at least one reference value. Preferably, such a reference value is to be understood as at least one actuator assessment parameter acquired at an earlier point in time. Further preferably, such a reference value is to be understood as at least one precalculated parameter which is preferably stored in the data storage device of the control unit device. Preferably, the actuator assessment parameter is compared to at least one reference value which is to be determined as being the threshold value. Preferably, said threshold value represents a critical energy content of the coil device. Such a critical energy content is in particular given when the energy content of the coil device is so low that the actuator apparatus can no longer function properly, particularly the actuating force too low to properly execute the actuating function. In cases of the energy content being lower than said threshold, it can then in particular be assumed that the actuator apparatus is no longer working at the required level of safety. Preferably, the threshold value is to be selected such that this representative energy content corresponds to 1 to 5 times the energy content, preferentially 1.25 to 4 times the energy content, and particularly preferentially, 1.5 to 2.5 times the energy content required for proper operation of the actuator apparatus. Further preferably, the reference value can also refer to the actuating power supplied; further preferably additional electrical circumstances of the actuating device are thereby considered.

In one preferential embodiment, the reduced actuating power is less than the actuating power supplied to the actuating device to move the actuating device, in particular so low that the stator device and the actuating device do not substantially move relative to each other. Preferably, the reduced actuating power is selected from a range between 0.01 to 0.5 times the actuating power, preferentially 0.01 to 0.25 times the actuating power, and particularly preferentially 0.01 to 0.1 times the actuating power. Further preferably, the reduced actuating power is transmitted to the coil device by the same control line device as the actuating power. A reduced actuating power in accordance with the invention enables the actuator apparatus to be assessed in non-actuated state and therefore particularly independently of planned actuator apparatus operation, thus providing an improved method of monitoring actuator apparatus function.

In one preferential embodiment, the supply of actuating power is interrupted by the actuator apparatus being decoupled from a power source, preferably galvanically isolated, further preferably decoupled in the manner of a potential difference between at least two electrical connections of the coil device being equalized. The power source in particular provides the electrical power for actuating the actuator apparatus, preferably a vehicle power supply network is to be understood as the power source. Preferably, a switching device is triggered for said interruption, preferably a circuit breaker device such as a relay device or a power-electronic component, preferably a thyristor device or the like. Interrupting the power supply, particularly by galvanic isolation, ensures that no creepage can lead to power being supplied or to a possible misinterpretation of the functional efficiency, thus providing an improved method of monitoring the actuator apparatus.

In one preferential embodiment, the control line device for discharging the electrical energy stored in the coil is controlled so as discharge it to an electrical power sink as coil power. Preferably, an electrical power sink is to be understood as an electrical storage device, an electrical resistance or the like. Preferably, a switching device is activated to control the control line device, particularly by means of a control unit device. Further preferably, this control operation enables the power flow via a free-wheeling diode device. A free-wheeling diode device is hereby to be understood as a device in the control line device which only enables current flow in one direction, preferably in the opposite direction of the actuating power flow, at least in one section of the control line device. Said section of the control line device preferably comprises the electrical power sink. Further preferably, the control line device is monitored by the electrical measuring device, preferably after the supply of actuating power has been interrupted. Preferably, the control line device is controlled by the actuating of power-electronic components such as thyristors or the like or, further preferably, by means of a relay device. The selective actuating of the control line device in the sense of the coil power only being able to run off to the electrical power sink in one specific direction enables particularly precise measuring of the electrical power and thus an improved method for monitoring an actuator apparatus.

In one preferential embodiment, the measuring device determines at least one electrical variable during the monitoring of the control line device. Preferably, the control line device is monitored by a voltage measuring device and additionally or alternatively by a current measuring device. Further preferably, the control line device is monitored both by a voltage measuring device as well as a current measuring device.

In a further preferential embodiment, the temporal profile of the voltage and alternatively or additionally the temporal profile of the current is determined during the monitoring of the control line device. Preferably during said monitoring, the temporal profile of the voltage and current is monitored when the coil device is discharging to the electrical power sink. Particularly the determination of the relevant electrical variable temporal profile allows particularly precise concluding of the energy content of the coil device and thus provides an improved method for monitoring the actuator apparatus.

In one preferential embodiment, determination of the actuator assessment parameter is based on the numerical summation, respectively the integration of the temporal profile, of one or more of the electrical variables. Preferentially, the temporal profile of the product is integrated, respectively numerically summed, from the determined voltage and current profile. Particularly this assessing of the determined electrical variables allows conclusion of the coil power and thereby provides an improved method for monitoring the actuator apparatus.

In one preferential embodiment, the actuating power is supplied to the coil device only for a short period of time, such a shortened supply of the actuating power preferably not leading to the actuating device moving relative to the stator device, cf. reduced actuating power. A short period of time is thereby preferably to be understood as a period of time which is shorter than the period for supplying the actuating power to change the actuator apparatus over from its first into its second operating state and, even more preferentially, a dead time; i.e. a maximum current feed period which does not produce movement of the actuating device or an actuator pin of the actuator apparatus respectively. This shortened period of time is particularly dependent on the type of actuator, its resistance, power consumption, etc. Preferably, the shortened supply of actuating power is supplied for a period of 0.0001 seconds to 0.1 seconds, preferentially for a period of from 0.001 to 0.01 seconds, particularly for a period of from 0.003 seconds to 0.005 seconds, and most preferentially for 0.004 seconds. The period for supplying the shortened actuating power supply is particularly selected such that no planned actuating process occurs with the actuator apparatus. Preferentially, the supply of the actuating power, particularly a shortened or reduced actuating power, occurs upon the initial operation (startup process), in a motor vehicle thus particularly upon every startup process or upon every n-ten startup process (n>1), it is also alternatively or additionally possible for the shortened actuating power supply to be recurrently supplied and monitored according to a specific interval. Preferentially, the parameters determined in the recurring monitoring, particularly the actuator assessment parameters, are stored. A comparison of these actuator assessment parameters acquired at different times enables monitoring of the functional efficiency of the actuator apparatus, particularly the control line device and the coil device. In particular, varying, particularly increasing, resistances at electrical contact points can thus be detected; an improved method for monitoring an actuator apparatus is thus provided.

The inventive actuator monitoring apparatus for realizing the inventive method comprises a CPU, particularly a control unit device having a computing unit and a data storage device, as well as a power control device, particularly a switching device, particularly as part of the power control device, for regulating a power flow. The actuator monitoring apparatus further comprises a measuring device for measuring at least one electrical parameter which can arise during changing an actuator apparatus over from the first into the second operating state or vice versa. The actuator apparatus comprises a stator device and an actuating device, wherein the actuating device is movably mounted with respect to the stator device. The first and second operating state of the actuator apparatus differ by the different positions of the stator device and the actuating device relative to one another.

In one preferential embodiment, the actuator monitoring apparatus comprises a switching device. Preferably, the power flow to the electrical coil device can be interrupted by means of said switching device. Preferably, the switching device is configured as a power-electronic component, particularly preferentially as a thyristor device. Further preferably, the switching device is configured as a relay device. By means of the described design of the switching device, the power flow through the control line device can be safely and reliably controlled, thus providing an improved method for monitoring an actuator apparatus.

In one preferential embodiment, the actuator monitoring apparatus comprises a current conduction device. Preferably, said current conduction device is configured as a device which prevents electrical power flow in one direction, preferably in the direction of the actuating power, further preferably the current conduction device is configured as a free-wheeling diode device. Further preferably, said free-wheeling diode device is arranged in a section of the control line device preferably situated between the electrical power sink and the coil device. Preferably, the actuator monitoring apparatus also comprises a further control line device, alternatively or additionally to the control line device provided for transmitting the actuating power, for transmitting a further actuating power, particularly a reduced or shortened actuating power supply. Accordingly, the actuator monitoring apparatus can preferably also comprise two control line devices. Particularly in such a design, the entire actuator apparatus as a whole can be monitored by means of the first control line device, which transmits the actuating power, and the coil device can be monitored separately therefrom by means of the second control line device. The assessing of both monitoring results enables better isolating of a potential actuator apparatus malfunction; an improved method for monitoring an actuator apparatus is thus provided.

Further features of the invention follow from the description of the schematic figures.

Figure 1:
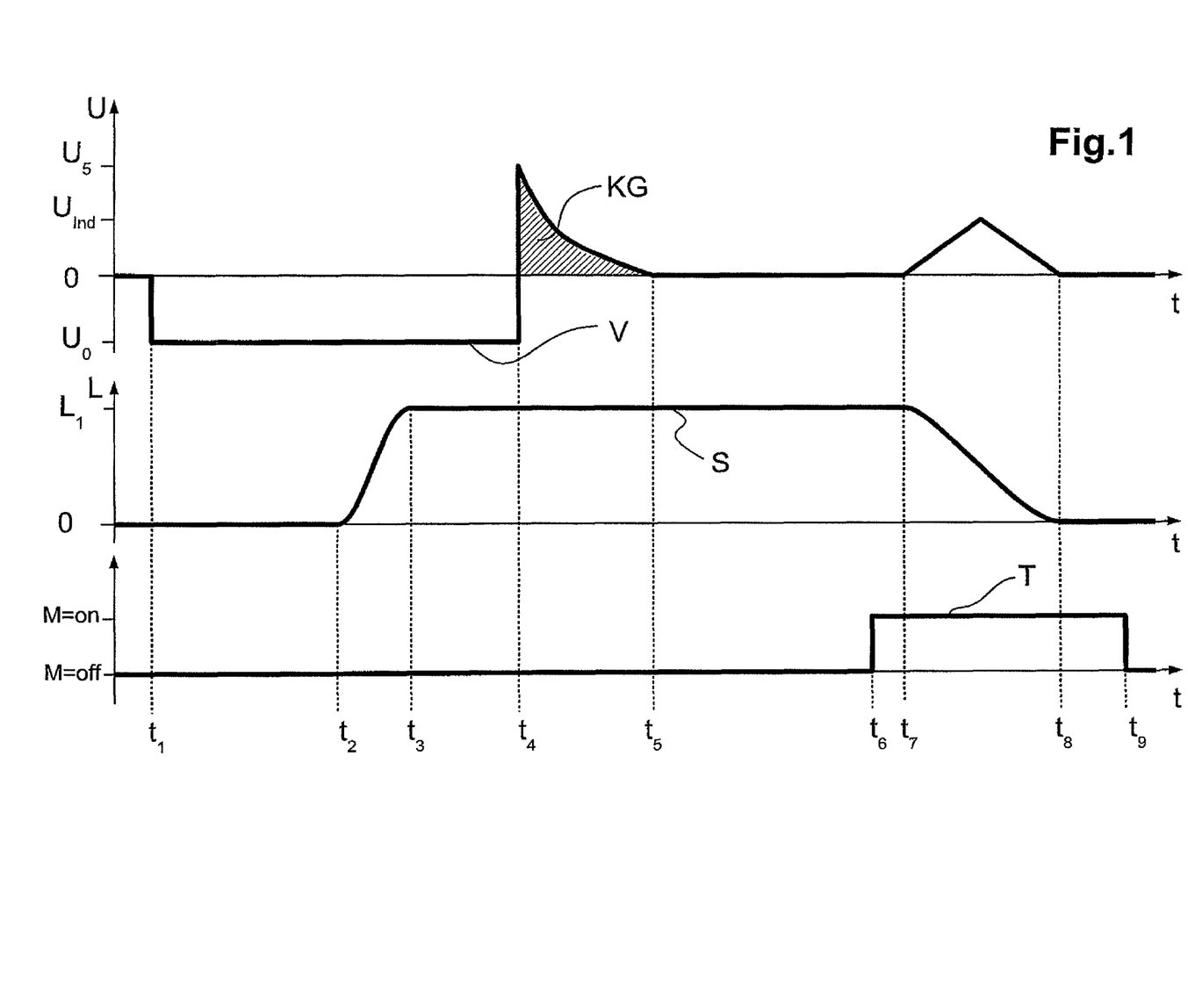
FIG. 1 shows the determining of the actuator assessment parameters.

FIG. 1 depicts the temporal profile of voltage U for the actuation of the actuator apparatus as well as the travel path L of the actuating device relative to the stator device effected by the actuating force by way of example of a motor vehicle actuator apparatus for a valve control for a lift valve comprising two cams in accordance with DE 42 30 877 A1. The actuator apparatus is initially in its initial position (first operating state). The feed or current to the actuator apparatus begins at time $t_1$ with the drop in voltage represented by line V. At this point in time, the supply of actuating power to the coil device begins. At time $t_2$, the actuating force acting on the actuating device from the stator device is so high that the actuating device starts to move, this is visible in the slope of line S. The actuating device reaches its final position (second operating state) at time $t_3$ and ceases its travel. At time $t_4$, the applied voltage V1 and thus the power supply to the coil device is interrupted. The actuating device however remains in its current position until subjected to a restoring force. Interrupting the actuating power supply induces a voltage $U_s$. Coil power begins to discharge from the coil device at the moment at which the supply of actuating power is interrupted. This discharge of coil power is monitored by an electrical measuring device; in the present case, at least the temporal profile of the voltage is determined. The coil power discharge ends at time $t_5$. The actuator assessment parameter is determined by the numerical summation of the electrical variables measured in the interval between $t_4$ and $t_5$. In the present case, this is represented by area KG. At time $t_7$, a restoring force acts on the actuating device to return it to its initial position (first operating state). The actuating device reaches its initial position at time $t_8$. The returning of the actuator apparatus from its second operating state to its first operating state again induces a voltage in the coil device due to the Lorentz force which reaches a maximum $U_{Ind}$. This induced voltage, to the extent it can be assessed, can be understood as a discard signal. Only to the extent that such a discard signal can be determined can it be assumed that the actuating device moved as planned relative to the stator device. Line T represents the discard signal measuring which is preferentially time-controlled. In the present case, the measuring begins at time $t_6$ and ends at time $t_9$. The time control of the measurement prevents another voltage induction in the coil device from being identified as a discard signal, e.g. due to contamination.

The combination of discard signal and assessment allows the differentiated concluding of specific actuator apparatus irregularities. If the assessment of the actuator assessment parameter shows it to be higher than a threshold value, electrical functional efficiency is a given. If, however, there is no discard signal, a mechanical malfunction of the actuator apparatus can be concluded. Should there be irregularities, e.g. a gradual degradation of the actuator assessment parameter and the discard signal can be detected, an electrical malfunction can be assumed. If the actuator assessment parameter is below the predefined threshold value and there is no discard signal, the conclusion can be made that there is an electrical malfunction in the actuation of the actuating device. The present invention also enables further assessment options.

Figure 2:
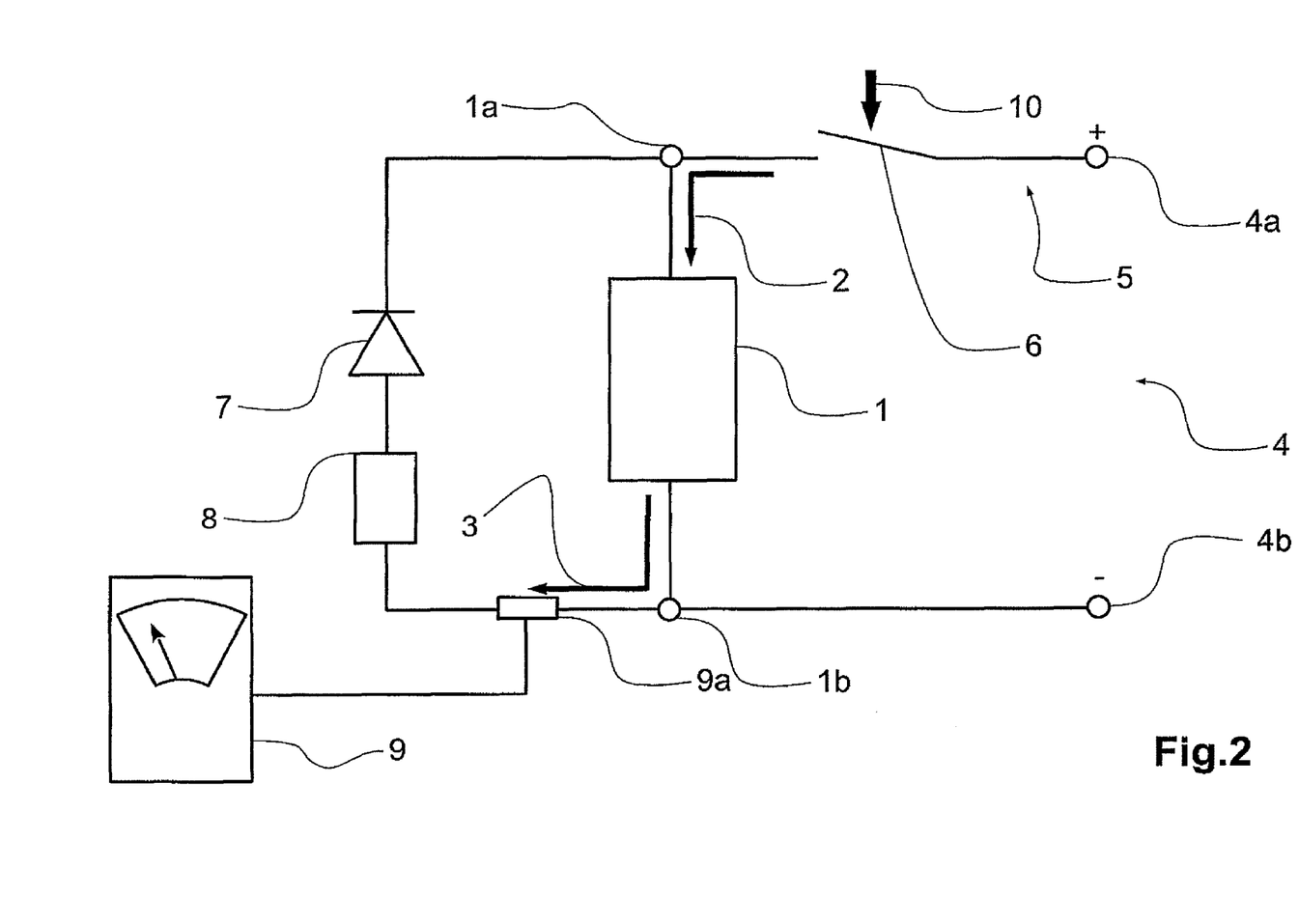
FIG. 2 shows a schematic circuit diagram for an actuator apparatus.

FIG. 2 depicts a partly schematic circuit diagram for an actuator apparatus which can be monitored by a device according to the invention for realizing the inventive method and by said very method. The coil device 1 is thereby fed actuating power 2 by the control line device 5 which comprises a switching device 6. The switching device 6 is induced to open and close by a control command 10 from the (not shown) control unit device. The opening and closing of the switching device 6 feeds energy from the energy source 4 to the coil device 1. The energy source 4 has a terminal 4a of higher potential than a second terminal 4b, hence a positive and a negative pole. The coil device 1 first receives the actuating power 2, the actuating power 2 moves the (not shown) actuating device according to plan and the actuating function of the actuator apparatus is fulfilled. The electrical connections of the coil device 1a, 1b are connected together by means of a current control device, in the present case, a free-wheeling diode device 7 and an electrical load 8. A current control device is thereby configured so as to only allow a power flow against the actuating power 2. Should the supply of actuating power 2 be interrupted by a control command 10, respectively the potential difference at the electrical connections 1a, 1b of the coil device 1 equalized, the energy stored in the coil device 1 begins to discharge, draining the coil power 3. This discharge is enabled by the free-wheeling diode device 7 and the electrical load 8. An electrical measuring point 9a is further arranged in this part of the control line device 5, by means of which the measuring unit device 9a detects the temporal profile of the coil power (current, voltage). Said measuring unit device can also be integrated into the (not shown) control unit device. The actuator assessment parameter can ultimately be determined from the electrical variables thus measured, substantially the temporal profile of voltage U and additionally or alternatively the current.

| List of reference numerals | |
|---|---|
| 1 | coil device |
| 1a | electrical connections |
| 1b | electrical connections |
| 2 | actuating power |
| 3 | coil power |
| 4 | energy source |
| 4a | positive potential of energy source |
| 4b | negative potential of energy source |
| 5 | control line device |
| 6 | switching device |
| 7 | free-wheeling diode device |
| 8 | electrical load |
| 9 | measuring unit device |
| 9a | measuring point |
| 10 | control unit device control command |

The invention claimed is:

1. A method of assessing the status of an electromechanical actuator apparatus for a valve control, wherein the actuator apparatus is configured to control a plurality of control element devices in an internal combustion engine in a motor vehicle, the method comprising:
   supplying, by a control line device, an actuating power to the actuator apparatus;
   reducing, by the control line device, the supply of the actuating power;
   monitoring, by an electrical measuring device, the control line device and determining, by the electrical measuring device, an actuator assessment parameter and a discard signal of the actuator apparatus from data acquired by the monitoring;
   assessing, by a control unit device, the actuator assessment parameter using a comparative value based on the supplied actuating power; and
   assessing, by the control unit device, whether the discard signal was determined.

2. The method of claim 1, wherein the actuating power is reduced in the manner such that a stator device and an actuating device of the actuator apparatus do not substantially move relative to each other.

3. The method of claim 1, wherein the reducing comprises interrupting the supply of the actuating power, and wherein the actuator apparatus is galvanically isolated from a power source which supplies the actuating power.

4. The method of claim 1, wherein to discharge a coil power from a coil device, the control line device is controlled by the control unit device such that the coil power discharges to an electrical load and the control line device is thereby monitored by the electrical measuring device.

5. The method of claim 4, wherein the measuring device determines at least one electrical variable during the monitoring of the control line device.

6. The method of claim 5, wherein a voltage and/or a current is determined during the monitoring of the control line device by the electrical measuring device, and wherein a temporal profile of the electrical variable is determined during the monitoring by the electrical measuring device.

7. The method of claim 6, wherein the determination of the actuator assessment parameter is based on the numerical summation and/or integration of the temporal profile of the electrical variable.

8. An actuator monitoring apparatus for a valve control, the apparatus comprising:
    a CPU including a control unit device having a computing unit and a data storage device;
    a power control device configured to regulate a power flow;
    a measuring device configured to measure an electrical parameter; and
    a stator device and an actuating device, wherein the actuating device is movable relative to the stator device,
    wherein the actuator monitoring apparatus has first and second operating states,
    wherein the operating states differ by the different positions of the stator device and the actuating device relative to one another,
    wherein the actuator monitoring apparatus is further configured to i) receive an actuating power, ii) reduce the supply of the actuating power, iii) monitor a control line device and determine an actuator assessment parameter and a discard signal of the actuator apparatus from data acquired by the monitoring; iv) assess the actuator assessment parameter using a comparative value based on the supplied actuating power; and v) assess whether the discard signal was determined.

9. The apparatus of claim 8, wherein the power control device comprises a switching device configured to interrupt the flow of power toward an electrical coil device.

10. The apparatus of claim 9, further comprising a current conduction device configured to regulate the flow of the power from the coil device to an electrical load.

11. A non-transitory computer-readable medium storing a method for assessing the status of an electromechanical actuator apparatus for a valve control, wherein the actuator apparatus is configured to control a plurality of control element devices in an internal combustion engine in a motor vehicle, the method comprising:
    supplying, by a control line device, an actuating power to the actuator apparatus;
    reducing, by the control line device, the supply of the actuating power;
    monitoring, b an electrical measuring device, the control line device and determining, by device, an actuator assessment parameter and a discard signal of the actuator apparatus from data acquired by the monitoring;
    assessing, by a control unit device, the actuator assessment parameter using a comparative value based on the supplied actuating power; and
    assessing, by the control unit device, whether the discard signal was determined.

12. The method of claim 1, wherein a measurement by the electrical measuring device for determining the discard signal is time-controlled.

13. The apparatus of claim 8, wherein a measurement for determining the discard signal is time-controlled.

14. The non-transitory computer-readable medium of claim 11, wherein a measurement by the electrical measuring device for determining the discard signal is time-controlled.

* * * * *

UNITED STATES PATENT AND TRADEMARK OFFICE
CERTIFICATE OF CORRECTION

| | | |
|---|---|---|
| PATENT NO. | : 9,523,323 B2 | Page 1 of 1 |
| APPLICATION NO. | : 14/403983 | |
| DATED | : December 20, 2016 | |
| INVENTOR(S) | : Max Nestoriuc | |

It is certified that error appears in the above-identified patent and that said Letters Patent is hereby corrected as shown below:

In Column 10 at Line 18, Change "9a" to --9--.

In Column 12 at Line 22 (approx.), In Claim 11, change "b" to --by--.

In Column 12 at Line 23 (approx.), In Claim 11, after "by" insert --the electrical measuring--.

Signed and Sealed this
Twenty-fifth Day of April, 2017

Michelle K. Lee
*Director of the United States Patent and Trademark Office*